Nov. 15, 1927.  
E. P. GALASSI  
1,649,301  
AUTOMOBILE BUMPER  
Filed April 7, 1926   2 Sheets-Sheet 2
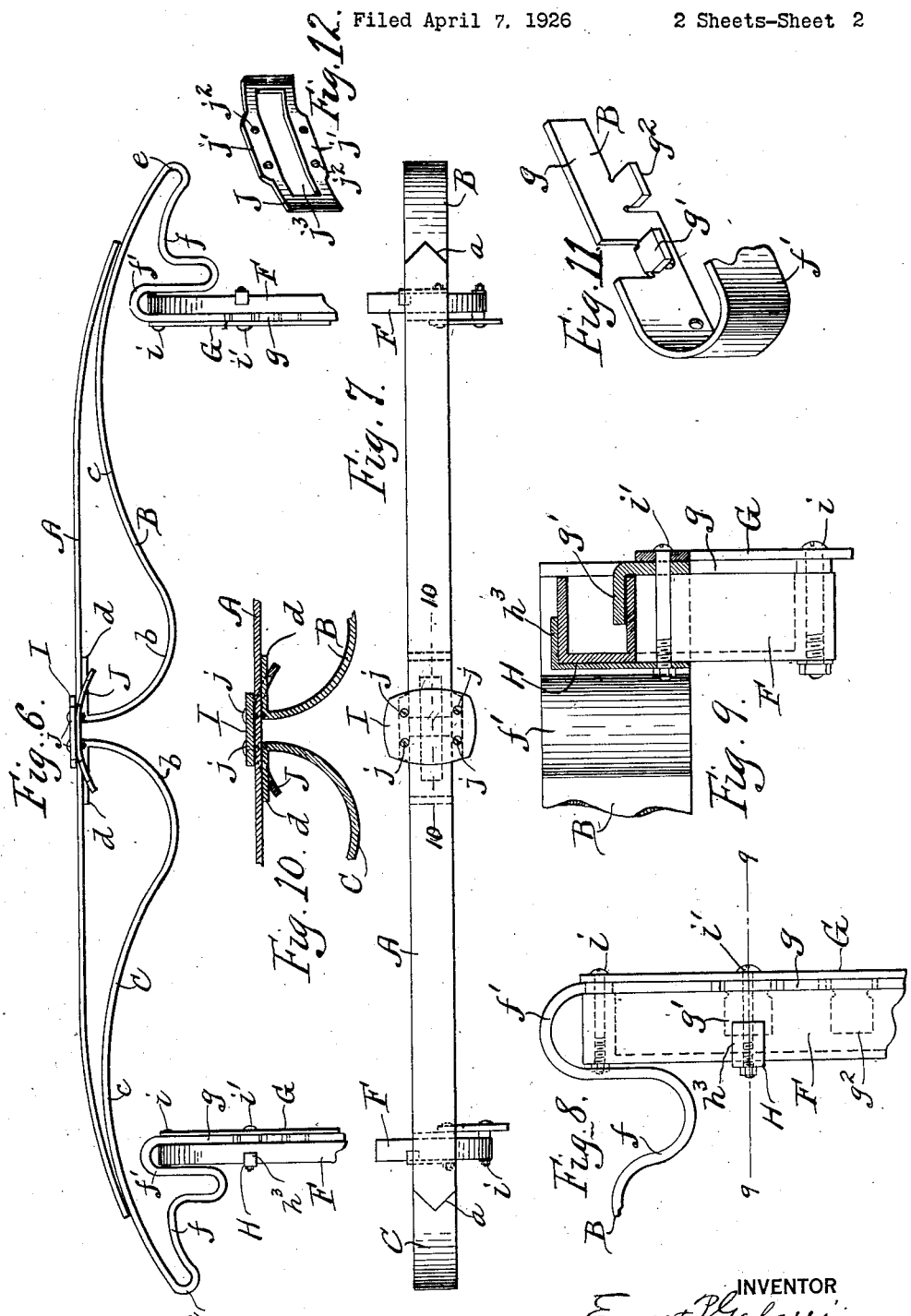
INVENTOR  
Ernest P. Galassi  
BY  
ATTORNEY Patented Nov. 15, 1927.

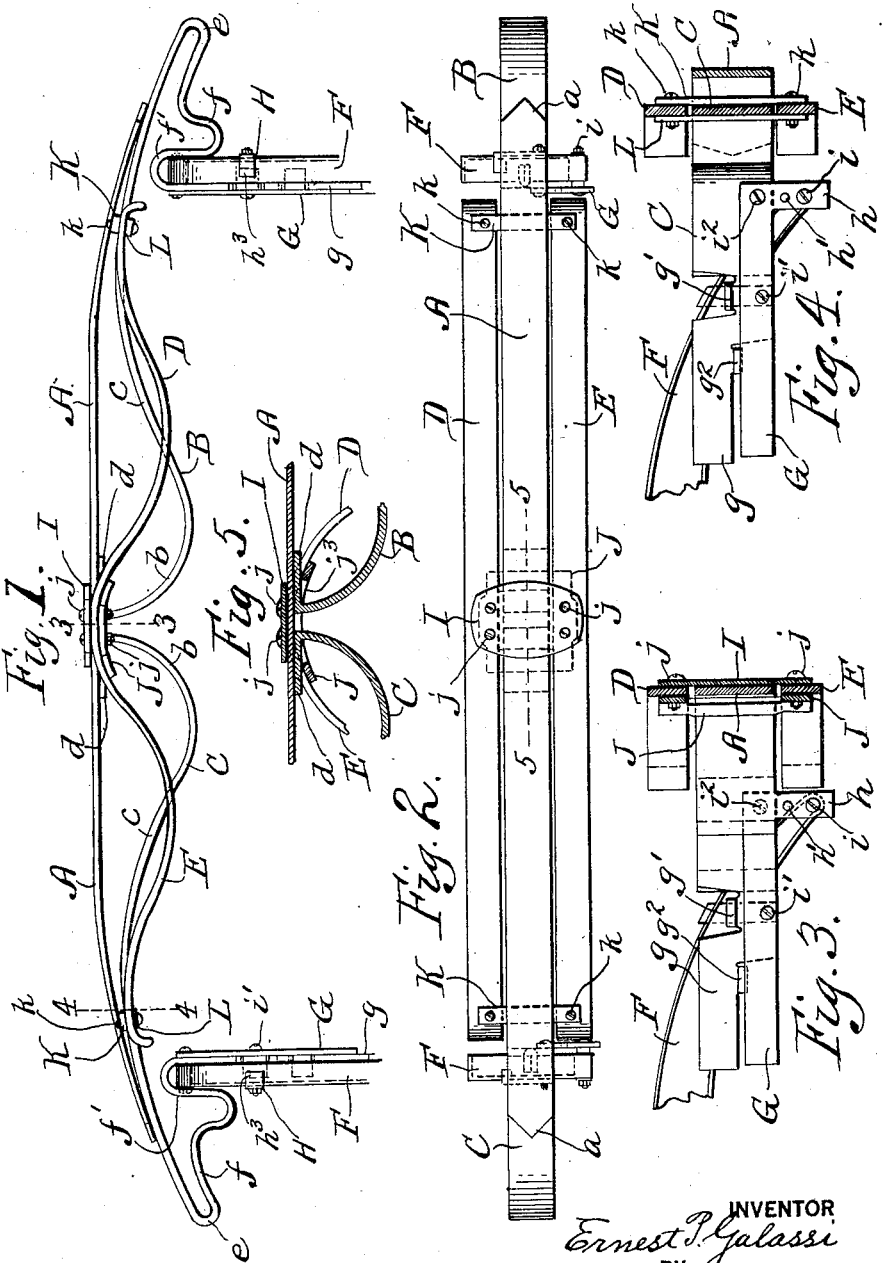

1,649,301

UNITED STATES PATENT OFFICE.

ERNEST P. GALASSI, OF BROOKLYN, NEW YORK, ASSIGNOR OF ONE-HALF TO GAETANO NOVELLO, OF NEW YORK, N. Y.

AUTOMOBILE BUMPER.

Application filed April 7, 1926. Serial No. 100,212.

My invention is a bumper or fender designed for use, more particularly, on automobiles at the front or the rear thereof, for reducing the shock incidental to a collision and thereby minimize the injury or breakage of parts.

The invention may be embodied in different constructional forms, wherein spring members are associated together for yielding movement under the shock. The bumper as an entirety is attachable to the forward part of the chassis by devices acting efficiently to support said bumper in an operative position, and adjacent to the attachment to said chassis, the members of the bumper structure are formed into compound springs yieldable in a sidewise direction, as well as in a fore and aft direction of the vehicle, whereby the liability of fracture or breakage is minimized at the attachment to the chassis.

The several spring members are retained in operative positions relatively to each other by clips of separable constructions with a view to effecting a variation in the resistance capacity of the bumper to resist shock. Thus, the separable clips provide for the assemblage of a given number of spring members, say three, in order to produce a light simple structure adapted for manufacture economically and designed for use more especially on comparatively light weight cars; but at the same time, said separable clips provide for the assemblage of a greater number of spring members, say a total of five parts, whereby to increase the resistance capacity to shock and adapt the structure for use on larger and heavier automobiles.

Other functions and advantages of the invention will appear from the following description taken in connection with the drawings, wherein—

Figure 1 is a plan view of a five-part spring bumper embodying my invention.

Figure 2 is a front elevation thereof.

Figure 3 is a vertical cross section on the line 3—3 of Figure 1.

Figure 4 is a similar cross section on the line 4—4 of Figure 1.

Figure 5 is an enlarged detail horizontal section on the line 5—5 of Figure 2.

Figure 6 is a plan view of a three-part spring bumper included within my invention.

Figure 7 is a front view of the bumper shown in Figure 6.

Figure 8 is an enlarged detail in plan view of a part of a "goose neck" on the chassis illustrating means for the attachment of one of the spring members.

Figure 9 is an enlarged cross section on the line 9—9 of Figure 8.

Figure 10 is a horizontal section on the line 10—10 of Figure 7.

Figure 11 is a perspective view of an end portion of one of the spring members.

Figure 12 is a perspective view of one part of the central clip.

My multi-part spring bumper of Figures 1 to 5, inclusive, comprises a longitudinal spring bar A, two rearwardly positioned spring members B, C, and complemental spring members D, E. The springs B, C, are the rear members of the bumper structure, for the reason that they are positioned in the horizontal plane of member A, rearwardly thereof, and, furthermore, said members B, C, are adapted for attachment to the forward ends of the chassis, the "goose necks" of which are indicated at F.

The front spring member A is a single continuous bar which is curved lengthwise to a certain extent, more especially toward the ends, at which the curvature is more pronounced than at the middle part. Each end of the spring bar A is pointed, at $a$, see Figures 2 and 7, but this is immaterial.

The rearwardly positioned spring members B, C, extend individually from the middle part of the front member A to the chassis F, said spring members B, C, being each curved substantially as shown in Figures 1, 5, 6, 10. Each spring member B or C is a multi-curved bar or plate, each member having, at the portion rearwardly of the middle part of the front member, a pronounced curvature at $b$ for a part of the length and a reversed curvature at $c$ for another part of the length, the extremity of the curved length $b$ being bent more or less abruptly to produce a short arm $d$, the latter extending in a straight line and projecting at an angle to the curved length $b$, see Figures 5 and 10. From the curved length $c$, each member B or C is bowed to a point beyond the end of the front member A, and then said member B or C is doubled backwardly at $e$, the doubled length $f$ being curved at $f'$ to extend around the front extremity of the chassis F, see Figures 1 and 6, and finally this doubled part f, f', is bent into an attaching arm g, Figure 11, which is constructed for engagement with the channeled face of the chassis, see Figures 8, 9 and 11. Said arm g is slit inwardly from its top edge, and the metal is bent to produce a lip g', and similarly the arm is slit inwardly from the bottom edge to produce a lip g², see Figures 8, 9 and 11, said lips g', g², being spaced for an appreciable interval and being in disalined relation considered lengthwise of the arm g. The arm g of the spring member is adapted to be applied against the inner face of the channeled and flanged chassis, and said lips g', g², of the arm are fitted into engagement with the flange of said channeled chassis, for one lip to lie on one side of the flange and the other lip to lie on the opposite side of the flange. The arms g of the respective spring members B, C, are attached fixedly to the chassis for supporting the bumper structure in the required position at the front of the automobile, although said attachment permits, also, a limited adjustment relatively to the chassis for the purpose of positioning the bumper at the required height. The attachment of the arm g of each spring B or C to the chassis is effected by placing the arm g against the inner channeled face of the chassis for the lugs g', g², to extend respectively above and below the lower flange of said chassis, and by the employment of plate members G, H, and suitable bolts. The plate G is a straight bar with an angular end h, said end h being provided with a series of transverse bolt holes, one shown at h' in Figures 3 and 4. The arm g of the spring member lies between the channeled face of the chassis and the long part of the plate G, and this plate is fastened to the chassis and to the spring arm g by bolts i, i', said bolt i' passing through plate G, spring arm g, and the chassis, whereas the bolt i passes through the end part of the chassis, the arm h of plate G, and the arm g of the spring member. Another bolt i² passes through the arm g and the plate G close to the point where arm h extends downwardly from plate G, see Figures 3 and 4. The plate G is on the inner side of the chassis along with the arm g of the spring member, but the other plate H is fitted against the outer side of the chassis F, said outer plate H having an opening through which passes the bolt i', and said outer plate having a lip h³ fitting over a part of the chassis to assist in retaining the plate in position. The bolts i, i', i², fasten the parts g, G, H, fixedly to the chassis, but the holes h' in the plate G permit a limited adjustment of the spring g in order to attach the bumper at the required height, the lips g', g², of said spring arm having a certain amount of play relatively to the flange of the channeled chassis.

Referring now to the construction at the middle part of the bumper, the members B, C, are arranged reversely to each other, i. e., they extend in opposite directions from the middle part of the front member A, and the short straight arms d of members B, C, extend in opposite directions to each other, one to the right and the other to the left from the said middle part of member A, see Figures 5 and 10. These arms d, d, of members B, C, have direct contact or bearing engagement with the rear face of front member A, at the middle part thereof, and said arms d, d, at the inner ends of the half springs or members B, C, are coupled fixedly to the member A, said coupling means being employed for the attachment, also, of the middle part of spring members D, E, when the bumper is constructed with parts D, E, in addition to parts A, B, C, as in Figures 1 to 5, inclusive.

Said coupling means is a front plate I, a rear plate J, and a number of bolts j. The front plate I is positioned vertically to extend across the spring member A, and part way across the spring members D, E, at the middle of said members, see Figures 1, 2, 3 and 5. The rear coupling plate J is of the slotted formation shown in Figure 12, having the enlarged middle parts j' provided with bolt holes j², the wide long slot j³ accommodating the bent arms d, d, of the rear spring members B, C, see Figure 5. The coupling plate J is arched or curved to conform approximately to the form of the members A, B, C, D, E, when members D, E, are used, and said plate J is fitted against the rear faces of members A, D, E, the bent ends d, d, of members B, C, passing into the slot j³ and being confined against the rear of spring A and the end bars of slotted plate J, see Figure 5. The bolts j pass through front plate I and spring members D, E, and rear plate J, said bolts acting to forcibly clamp the parts together and to retain the inner bent arms d, d, of the members B, C, in fixed relation to plates I, J, and to spring member A and to retain said ends d in similar relation to the spring members D, E.

It will be noted that the coupling plates I, J, are attached fixedly by bolts j to the spring members D, E, and are frictionally engaged with spring members A, B, C, for clamping the several members at the middle part thereof, but to retain the end portions of members D, E, in the required relation to the spring members B, C, I make use of clips shown in Figures 1, 2 and 4 of the drawings. Two of these clips K are used, one near each end portion of spring members D, E, and these clips are attached to members D, E, and engage frictionally with members B, C, the points of engagement with members B, C, being intermediate the curvature c and loop e, see Figure 1. Each clip comprises complemental plates K, L, and bolts k, one plate K being fitted against the front faces of springs D, E, and B or C, and the other plate being in contact with the rear faces of springs D, E, and B or C, as the case may be. The bolts k pass through front plate K, springs D, E, and rear plate L, but they are not directly attached to springs B or C, the latter passing between the plates K, L, and the parts being held frictionally by tightening up on the bolts k. The clips are thus arranged for coupling the springs D, E, to springs B or C, respectively but these clips do not have engagement with the front spring member A, the latter being coupled at its middle portion to the parts B, C, D, E, whereas the end parts of said front spring member extend across the clips and are in contact frictionally with the springs B, C, respectively.

The bumper comprising the spring members A, B, C, D, E, and their associated parts afford a structure which by the yielding resistance of the spring metal reduces the shock incidental to a collision of the vehicles, but in this connection it is noted that the rear springs B, C, are given the double curvature at f, f', which permits the bumper as a whole to yield to a sidewise blow, and thus reduce the tendency to fracture of the spring members B, C, when an end portion of the bumper only is exposed to shock. The bumper comprising the parts A to E, inclusive, is adapted, more particularly, for larger and heavier automobiles, but to adapt the bumper for use on smaller and lighter cars, it may be desirable to reduce the number of parts by omitting the spring members D, E, the resulting structure being shown in Figures 6, 7 and 10. The simplified form of bumper comprises the spring members A, B, C, central coupling I, J, and the described means for mounting members B, C, on the chassis; in other words, spring members D, E, and end clips K, L, are omitted. In this construction, the coupling I, J, is retained as in Figures 6, 7 and 10, for the attachment of bent ends, d, d, of spring members B, C, to the middle part of front spring member A, it being noted that the bolts j pass through plates I, J, above and below the springs A, B, C, for frictionally clamping the inner front ends d of springs B, C, to the middle part of front spring member A.

By reference to Figures 5, 10 and 12, it will be noted that the plate J of the central coupling is provided with an elongated opening or slot $j^3$ adapted for the reception of the bent ends d of the rear spring members. Such slot allows for the adjustment of the rear spring members B, C, in a longitudinal direction for the purpose of increasing or decreasing the total length of the bumper to adapt it for cars the intervals between the members F of the chassis may vary within certain limits. Thus, the spring members B, C, may be shifted to bring the bent ends d closer together, for decreasing the span of the bumper, or said members B, C, may be shifted endwise for separating the ends d within the limit permitted by the slot $j^3$ of the coupling plate, thus increasing the span or length of the bumper; but in either case, the coupling plate J co-operates with the plate I and bolts j for fixedly retaining the spring members B, C, in the required positions with respect to spring member A.

Parts of my invention may be used without the whole. Thus in some cases, I may use the spring members B, C, without using the other spring members D, E. The members B, C, may obviously be decreased in length by omitting the curved length, b, and a part of c, in which case each spring member B or C comprises the arm g, loop f', bent part f, the loop e and a part of length c. The rear springs B, C, when used to the exclusion of parts A, D, E, are attachable separately to the part F of the chassis so as to afford protection to the chassis, the wheels and the mud guards.

Having thus fully described the invention, what I claim as new and desire to secure by Letters Patent is:

1. In a bumper, a front spring member, a plurality of rear spring members each extending from the middle part of the front spring member, the outer end of each rear spring member being free from attachment to the front spring member, means whereby the inner ends of said rear spring members are coupled to the front spring member substantially at the middle part of the latter member, and means for attaching said outer ends of the rear spring members to a chassis.

2. In a bumper, a front spring member, a plurality of rear spring members each extending from the middle part of said front spring member, each rear spring member having its outer end portion free from attachment to said front spring member and said outer end portion of each rear spring member being bent in a direction rearwardly of the front spring member, means for coupling the inner end portions of the rear spring members to the middle portion of the front spring member, and means for coupling to a chassis said rearwardly bent end portions of the rear spring members.

3. In a bumper, a front spring member, a plurality of rear spring members, each extending from the middle part of the front spring member and the other end of each rear spring member being doubled upon itself to form a yielding part and an arm, coupling means for uniting the inner ends of the rear spring members to the middle part of the front spring member, and supporting means for attaching the arms of the rear spring members to a vehicle.

4. In a bumper, a front spring member, a plurality of rear spring members each having one end doubled backwardly and formed into a looped arm extending at an angle rearwardly to the bumper, means for coupling the several spring members at the middle part of the bumper, and means for attaching the rearwardly extending arms of the rear spring members to a vehicle.

5. In a bumper, a front spring member, a plurality of rear spring members each bent backwardly to provide a rearwardly extending arm at the end of said spring member, means including an apertured plate for adjustably attaching said arm of each rear spring member to a vehicle, and means for coupling the front spring member and the rear spring members to each other at the middle part of said bumper.

6. In a bumper, a front spring member, a plurailty of rear spring members each extending from the middle part of the front spring member toward one end thereof, other spring members above and below the horizontal plane of the front spring member and the rear spring members, and coupling means whereby all the spring members are retained at the middle of the bumper in relatively fixed position.

7. In a bumper, a front spring member, a plurality of rear spring members each extending from the middle part of the front spring member toward one end thereof, other spring members above and below the horizontal plane of the front spring member and the rear spring members, said other spring members being curved to extend crosswise of the rear spring members, and coupling means positioned at the middle part of the bumper and co-operable with all the spring members for retaining said spring members in fixed relation to each other.

8. In a bumper, a front spring member, a plurality of rear spring members each extending from the middle part of the front spring member toward one end thereof, other spring members above and below the horizontal plane of the front spring member and the rear spring members, coupling means at the middle part of the bumper for fixedly retaining all the spring members, and other coupling means engageable with the spring members and said other spring members for retaining the end portions of the later members in fixed relation to the rear spring members.

9. A bumper embodying a continuous front spring member, a plurality of rear spring members each extending from the middle part of the front spring member, said rear spring members being in the horizontal plane of the front spring member, a plurality of other spring members extending above and below the front spring member, coupling means for retaining all the spring members in fixed relation to each other at the middle of the bumper, and clips for attaching the end portions of said other spring members to the rear spring members.

10. In a bumper, a front spring member, a plurality of rear spring members, and a coupling for attaching the rear spring members to said front spring member, said rear spring members being shiftable relatively to the coupling and the front spring member whereby the span of the bumper may be increased or decreased.

In testimony whereof I have hereto signed my name this 1st day of April, 1926.

ERNEST P. GALASSI.